(12) United States Patent
Suzuki et al.

(10) Patent No.: US 10,941,727 B2
(45) Date of Patent: Mar. 9, 2021

(54) PISTON

(71) Applicant: NISSAN MOTOR CO., LTD., Yokohama (JP)

(72) Inventors: Takuma Suzuki, Kanagawa (JP); Yutaka Mabuchi, Kanagawa (JP); Yuka Suzuki, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/493,841

(22) PCT Filed: Apr. 4, 2017

(86) PCT No.: PCT/JP2017/014124
§ 371 (c)(1),
(2) Date: Sep. 13, 2019

(87) PCT Pub. No.: WO2018/185847
PCT Pub. Date: Oct. 11, 2018

(65) Prior Publication Data
US 2020/0123999 A1    Apr. 23, 2020

(51) Int. Cl.
*F02F 3/00* (2006.01)
*F02F 3/14* (2006.01)
*F02F 3/24* (2006.01)
*F16J 1/09* (2006.01)
*F02F 3/04* (2006.01)

(52) U.S. Cl.
CPC ................. *F02F 3/14* (2013.01); *F02F 3/24* (2013.01); *F16J 1/09* (2013.01); *F02F 3/045* (2013.01)

(58) Field of Classification Search
CPC ...... F02F 3/14; F02F 3/24; F02F 3/045; F02F 3/12; F02F 3/28; F02F 3/26; F16J 1/09
See application file for complete search history.

(56) References Cited

U.S. PATENT DOCUMENTS 4,711,208 A * 12/1987 Sander ................ F02B 23/0696
                                                   123/271
6,138,639 A * 10/2000 Hiraya ..................... F01L 3/06
                                                   123/295

(Continued)

FOREIGN PATENT DOCUMENTS

CN          1372617 A       10/2002
GB          2188123 A  *    9/1987  ............... F02F 3/12

(Continued)

*Primary Examiner* — Hung Q Nguyen
(74) *Attorney, Agent, or Firm* — Faegre Drinker Biddle & Reath LLP (57) ABSTRACT

In a piston of an internal combustion engine in which a recessed portion that holds an intake air swirling flow is formed on a crown surface of the piston, the crown surface includes a heat insulating film formation portion having a heat insulating film whose thermal conductivity is lower than a base material of the piston, the heat insulating film whose thermal capacity per volume is smaller than the base material of the piston, and a heat insulating film non-formation portion provided at a position on the more outside of a cylinder bore side of the internal combustion engine than the heat insulating film formation portion, the heat insulating film non-formation portion not having the heat insulating film.

2 Claims, 11 Drawing Sheets

(56) References Cited

U.S. PATENT DOCUMENTS

| | | | | |
|---|---|---|---|---|
| 7,055,491 B2* | 6/2006 | Linderyd | ................ | F02B 23/04 |
| | | | | 123/279 |
| 2002/0078919 A1 | 6/2002 | Yasuoka et al. | | |
| 2009/0260594 A1* | 10/2009 | Hara | ...................... | B23P 15/10 |
| | | | | 123/193.6 |
| 2012/0318230 A1 | 12/2012 | Omura et al. | | |
| 2013/0327289 A1* | 12/2013 | Hiratsuka | ................ | F01L 3/04 |
| | | | | 123/193.6 |
| 2016/0169185 A1 | 6/2016 | Iwasaki et al. | | |

FOREIGN PATENT DOCUMENTS

| | | | | |
|---|---|---|---|---|
| JP | 58197454 A | * | 11/1983 | ................ F02F 3/12 |
| JP | H11-193721 A | | 7/1999 | |
| JP | 2014-20283 A | | 2/2014 | |
| JP | 2014-105619 A | | 6/2014 | |
| JP | 2015-218608 A | | 12/2015 | |
| JP | 2016-180360 A | | 10/2016 | |
| JP | 2016-186257 A | | 10/2016 | |
| JP | 2017-002835 A | | 1/2017 | |
| JP | 2017-39798 A | | 2/2017 | |
| WO | WO-2009020206 A1 | * | 2/2009 | ................ F02F 1/18 |
| WO | WO 2014/188494 A1 | | 11/2014 | |
| WO | WO 2014/188495 A1 | | 11/2014 | |
| WO | WO-2015/029985 A1 | | 3/2015 | |

\* cited by examiner

PISTON

TECHNICAL FIELD

The present invention relates to a piston of an internal combustion engine, the piston having a heat insulating film.

BACKGROUND ART

JP2014-20283A discloses a structure including a heat shielding film formed in a top portion of a piston, the heat shielding film for suppressing heat transfer to the inside of the piston, and a recessed portion provided in the top portion of the piston while being spaced from an outer peripheral portion of the piston, wherein a terminal part of the heat shielding film is arranged in the recessed portion provided in the top portion of the piston.

SUMMARY OF INVENTION

According to such a conventional art, there is an advantage that, by the heat insulating film (heat shielding film) suppressing heat transfer, a decrease in a temperature in a cylinder can be suppressed and combustion efficiency can be improved.

Meanwhile, the heat insulating film generally has large thermal capacity per volume. Therefore, by a temperature of the heat insulating film being increased by combustion of air-fuel mixture, the air-fuel mixture in the cylinder receives heat from the heat insulating film heated in intake and compression processes, and a temperature of the air-fuel mixture is increased. Thus, there is a problem that knocking more easily occurs and a knocking performance is lowered.

An object of the present invention is to provide a piston capable of suppressing a decrease in a knocking performance while suppressing reduction in a cooling loss.

According to one aspect of this invention, in a piston of an internal combustion engine in which a recessed portion that holds an intake air swirling flow is formed on a crown surface of the piston, the crown surface includes a heat insulating film formation portion having a heat insulating film whose thermal conductivity is lower than a base material of the piston, the heat insulating film whose thermal capacity per volume is smaller than the base material of the piston, and a heat insulating film non-formation portion provided at a position on the more outside of a cylinder bore side of the internal combustion engine than the heat insulating film formation portion, the heat insulating film non-formation portion not having the heat insulating film.

DESCRIPTION OF EMBODIMENTS

Hereinafter, with reference to the drawings, etc., an embodiment of the present invention will be described.

Figure 1:
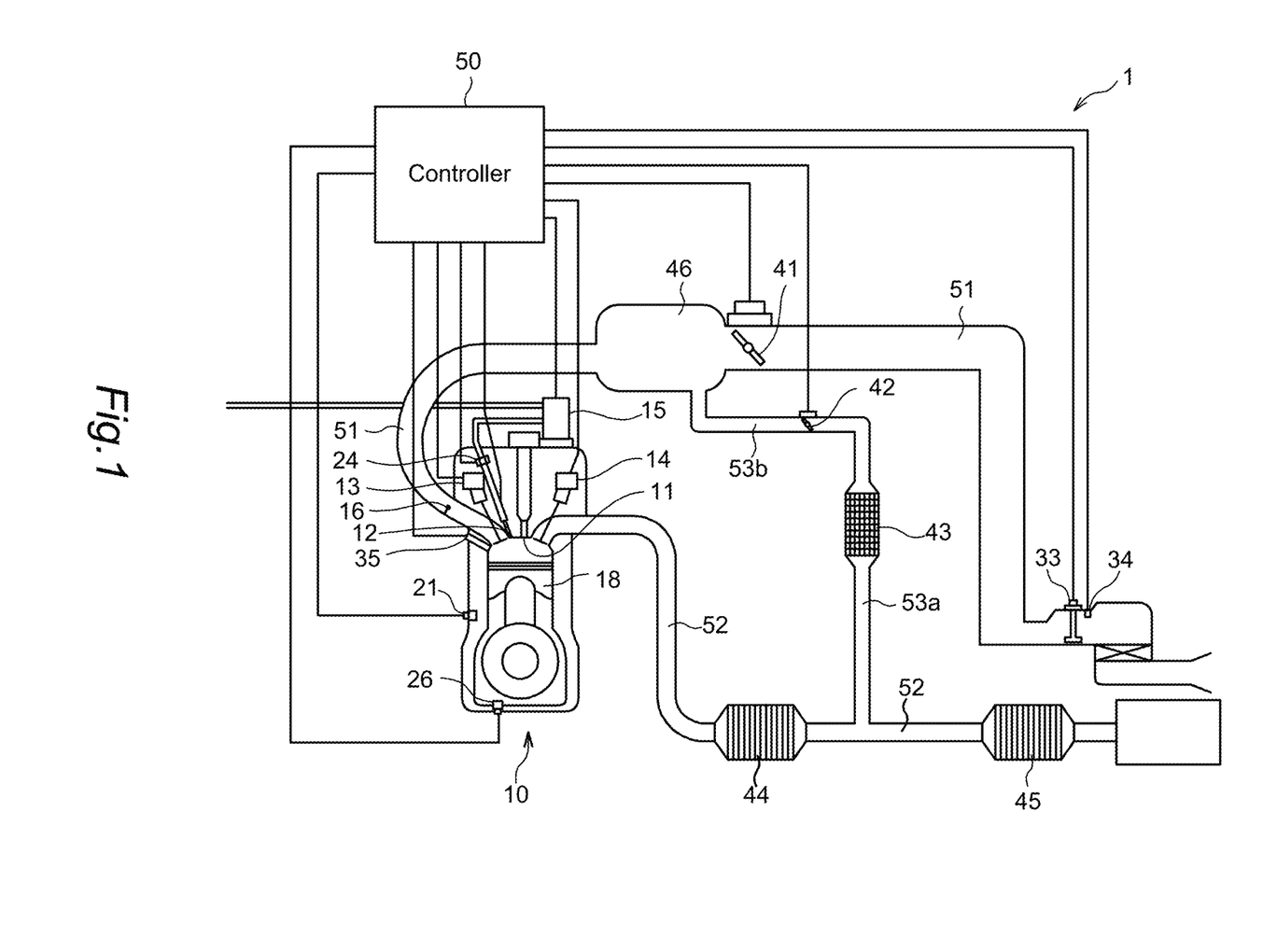
FIG. 1 is an illustrative diagram of the entire configuration of an internal combustion engine system.

FIG. 1 is an illustrative diagram of the entire configuration of an internal combustion engine system 1 of the present embodiment. The internal combustion engine system 1 includes an internal combustion engine 10 to which an intake passage 51 and an exhaust passage 52 are respectively connected. In the internal combustion engine 10, by combusting air-fuel mixture taken in from the intake passage 51, a piston 18 reciprocates to drive. Exhaust gas after combustion is discharged to the exhaust passage 52.

A tumble control valve 16 is provided in the intake passage 51. The tumble control valve 16 generates tumble fluidity in a cylinder by closing part of a flow passage section of the intake passage 51.

A collector tank 46 is provided in the intake passage 51. An EGR passage 53b is connected to the collector tank 46.

In the intake passage 51, an air flow meter 33 is provided on the upstream of the collector tank 46. A controller 50 connected to the air flow meter 33 obtains a flow rate (intake amount) of the air flowing through the inside of the intake passage 51 from the air flow meter 33. An intake air temperature sensor 34 is provided in the intake passage 51 in the vicinity of the air flow meter 33. The controller 50 connected to the intake air temperature sensor 34 obtains a temperature (intake air temperature) of the air passing through the intake passage 51 from the intake air temperature sensor 34.

An electronic control throttle 41 is provided in the intake passage 51, and a throttle opening degree is controlled by the controller 50.

Exhaust catalysts 44, 45 for exhaust purification are provided in the exhaust passage 52. Three-way catalysts, etc. are used as the exhaust catalysts 44, 45. The exhaust passage 52 branches to an EGR passage 53a connected to the collector tank 46 between the exhaust catalyst 44 and the exhaust catalyst 45.

An EGR cooler 43 is provided in the EGR passage 53a. An EGR valve 42 is provided in the EGR passage 53b. The EGR valve 42 is connected to the controller 50. According to an operation condition of the internal combustion engine 10, an opening degree of the EGR valve 42 is controlled by the controller 50.

The internal combustion engine 10 includes an ignition plug 11, a fuel injection valve 12, an intake side valve timing control mechanism 13, and an exhaust side variable valve mechanism 14. Further, the internal combustion engine 10 includes a fuel injection pump 15 and the piston 18. The fuel injection valve 12 is a directly-upward injection valve that directly injects fuel into the cylinder, and is provided in the vicinity of the ignition plug 11.

The ignition plug 11 performs spark ignition in a combustion chamber of the internal combustion engine 10. The ignition plug 11 is connected to the controller 50, and a spark ignition timing is controlled by the controller 50.

The fuel injection valve 12 is connected to the controller 50, and a fuel injection timing is controlled. In the present embodiment, so-called multi-stage injection in which fuel is injected multiple times including an intake process is performed. The fuel injection pump 15 supplies the pressurized fuel to the fuel injection valve 12.

The intake side valve timing control mechanism 13 changes an opening/closing timing of an intake valve. The exhaust side variable valve mechanism 14 changes an opening/closing timing of an exhaust valve. The intake side valve timing control mechanism 13 and the exhaust side variable valve mechanism 14 are connected to the controller 50. The controller 50 controls the opening/closing timings of the intake side valve timing control mechanism 13 and the exhaust side variable valve mechanism 14. In the present embodiment, the intake side valve timing control mechanism 13 and the exhaust side variable valve mechanism 14 are shown. However, only one of the variable valve mechanisms may be provided.

A knocking sensor 21, a fuel pressure sensor 24, a crank angle sensor 26, and a in-cylinder pressure sensor 35 are provided in the internal combustion engine 10. The knocking sensor 21 and the fuel pressure sensor 24 detect a state of knocking of the internal combustion engine 10 and fuel pressure of the fuel fed from the fuel injection pump 15 and send to the controller 50.

Similarly, the crank angle sensor 26 detects a crank angle in the internal combustion engine 10. The crank angle sensor 26 is connected to the controller 50, and sends the crank angle of the internal combustion engine 10 to the controller 50. The in-cylinder pressure sensor 35 detects pressure of the combustion chamber in the internal combustion engine 10. The in-cylinder pressure sensor 35 is connected to the controller 50, and sends the pressure of the combustion chamber of the internal combustion engine 10 to the controller 50.

The controller 50 reads outputs from the various sensors described above and other sensors (not shown), and controls the fuel injection timing, the ignition timing, the valve opening/closing timings, an air-fuel ratio, etc. based on these outputs and maps stored in advance, etc.

Figure 2:
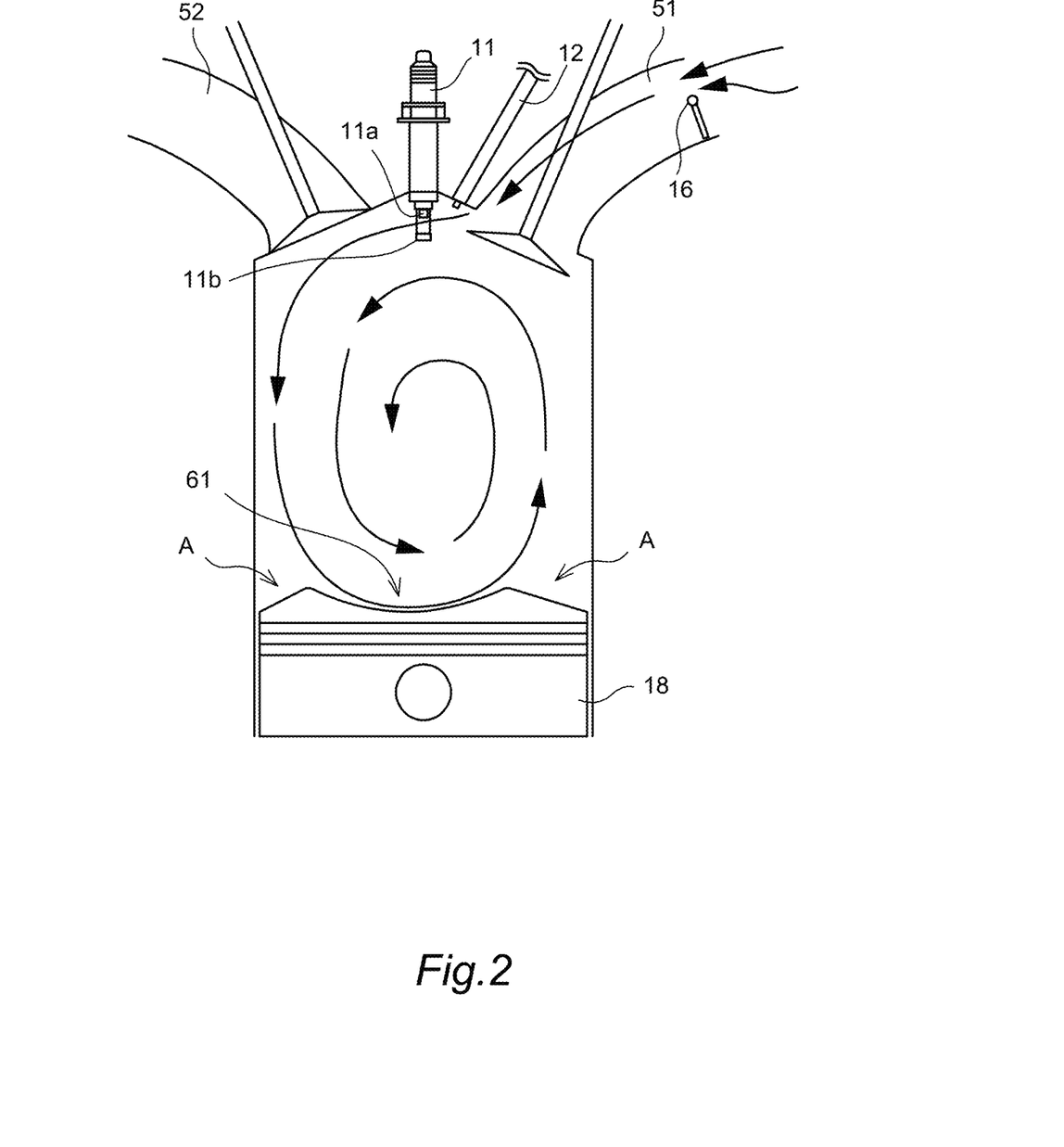
FIG. 2 is an illustrative diagram of tumble fluidity occurring in a cylinder.
Figure 3:
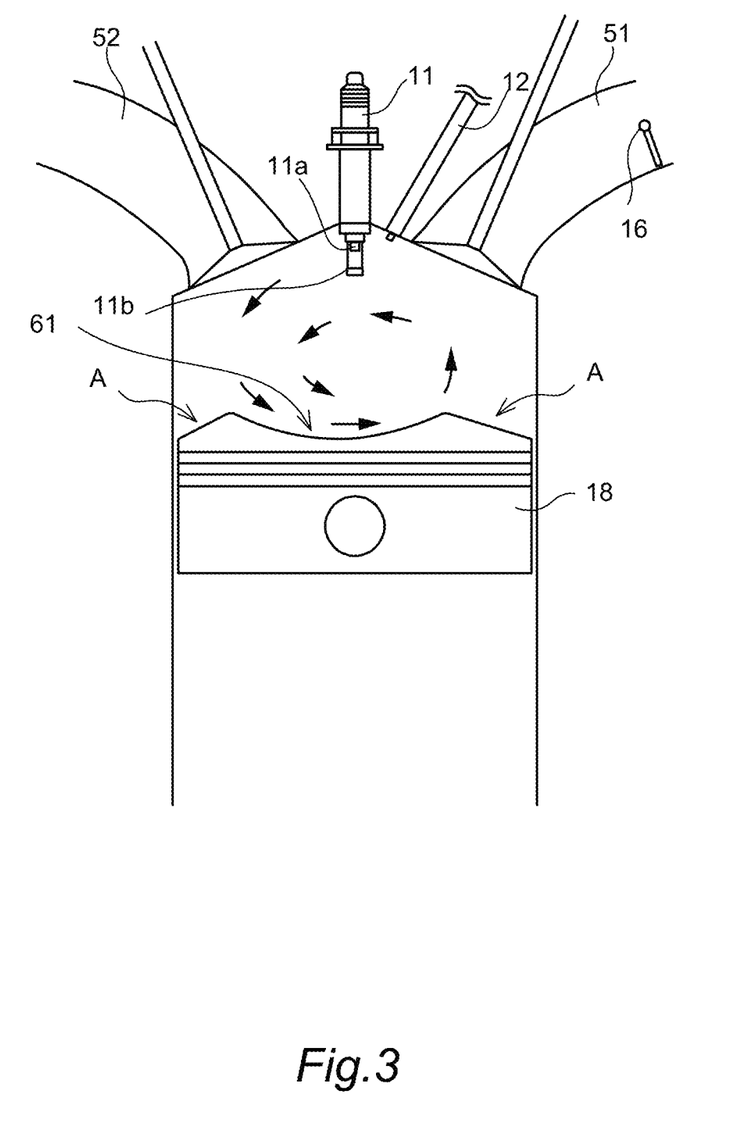
FIG. 3 is an illustrative diagram of collapse of the tumble fluidity.

FIG. 2 is an illustrative diagram of tumble fluidity occurring in the cylinder of the internal combustion engine 10 of the present embodiment. FIG. 3 is an illustrative diagram of collapse of the tumble fluidity of the internal combustion engine 10 of the present embodiment.

FIGS. 2 and 3 show the intake passage 51, the exhaust passage 52, the ignition plug 11, the fuel injection valve 12, and the tumble control valve 16. FIGS. 2 and 3 show a central electrode 11a and an outside electrode 11b of the ignition plug 11.

In FIG. 2, the tumble fluidity in the cylinder in the intake process is shown by arrows. In FIG. 3, the tumble fluidity in the cylinder in a compression process is shown by arrows.

A shallow dish 61 serving as a recessed portion is formed on a crown surface of the piston 18 of the present embodiment. The shallow dish 61 is formed in a smooth recessed shape suitable for holding the tumble fluidity.

In the intake process of the internal combustion engine 10, when the tumble control valve 16 is closed, the intake air flows while being biased to the upper side in the figure of the intake passage 51, and flows into the cylinder. As a result, as shown in the figure, intake air swirling fluidity (tumble fluidity) swirling in the vertical direction is formed in the cylinder. By moving along a surface of the shallow dish 61 on the crown surface of the piston 18, the tumble fluidity is held. In the vicinity of a cylinder bore on the crown surface of the piston 18 (at a point shown by the reference sign A in FIG. 2), fluidity of the air-fuel mixture is brought out of the tumble fluidity and weakened.

After that, as shown in FIG. 3, by the piston 18 being raised in the compression process, the combustion chamber in the cylinder is narrowed down. When the combustion chamber is narrowed down, the tumble fluidity is crushed down, the fluidity is gradually unable to be maintained and collapses at the end.

While the tumble fluidity is maintained, mixture of the fuel and the intake air is facilitated. Therefore, when the tumble fluidity collapses, the air-fuel mixture in the cylinder is homogenized. However, after the collapse of the tumble fluidity, the fluidity of the air-fuel mixture in the cylinder is weakened. When the fluidity of the air-fuel mixture in the cylinder is weakened, a plug discharge channel is not sufficiently extended at the time of ignition of the ignition plug 11. The "plug discharge channel" is an arc occurring between the central electrode 11a and the outside electrode 11b of the ignition plug 11. In particular, when the fluidity of the air-fuel mixture in the vicinity of the ignition plug 11 is weakened, a flame kernel generated by the spark ignition does not easily grow. Thus, misfire or partial burn more easily occurs.

Therefore, fluidity is provided in the vicinity of the ignition plug at a timing close to the ignition so that the plug discharge channel is sufficiently extended at the time of plug ignition at a compression top dead center or later. Specifically, the controller 50 controls so that further fuel injection is performed during a period from the collapse of the tumble fluidity and generation of the plug discharge channel in addition to the intake process and the expansion process of the multiple-stage injection described above.

Figure 4:
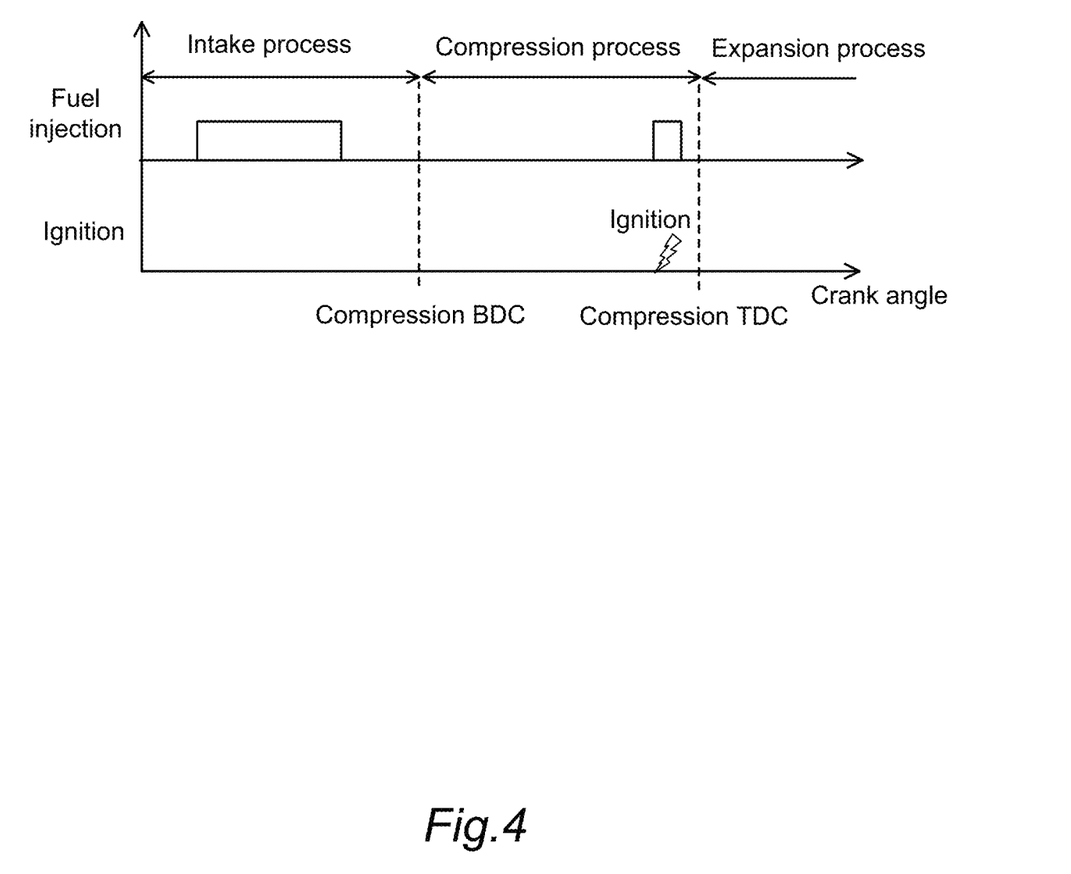
FIG. 4 is a diagram showing a relationship between a fuel injection timing and an ignition timing.

FIG. 4 is an illustrative diagram showing a relationship between the fuel injection timing and the ignition timing in the present embodiment.

As shown in FIG. 4, not only the fuel injection is performed in the intake process but also further fuel injection is performed in time with the ignition timing of the ignition plug 11 in the compression process. Since the fuel injection valve 12 is arranged in the vicinity of the ignition plug 11, part of the injected fuel passes through the vicinity of the ignition plug 11. Thereby, the fluidity is provided in the vicinity of the ignition plug 11.

In consideration with a possibility that part of sprays is attached to the central electrode 11a and the outside electrode 11b of the ignition plug 11 due to turbulence of the air flow by fuel sprays, the fuel may be injected after the injection of the expansion process.

Figure 5:
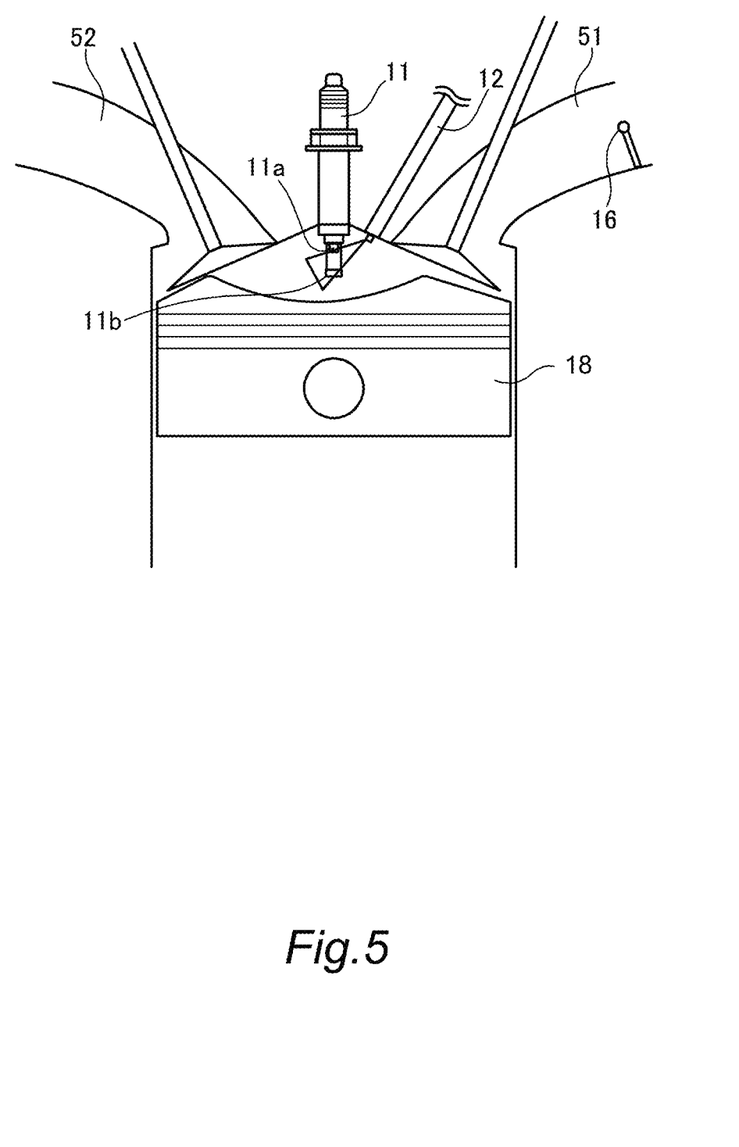
FIG. 5 is an illustrative diagram of provision of the fluidity in the vicinity of a plug.

FIG. 5 is an illustrative diagram of provision of the fluidity in the vicinity of the plug. As described above, the fuel injection valve 12 is a directly-upward injection valve, and is provided in the vicinity of the ignition plug 11. Therefore, part of the injected fuel passes through the vicinity of a discharge gap. Thus, by performing the fuel injection after the collapse of the tumble fluidity, the fluidity can be provided in the vicinity of the ignition plug.

Figure 6:
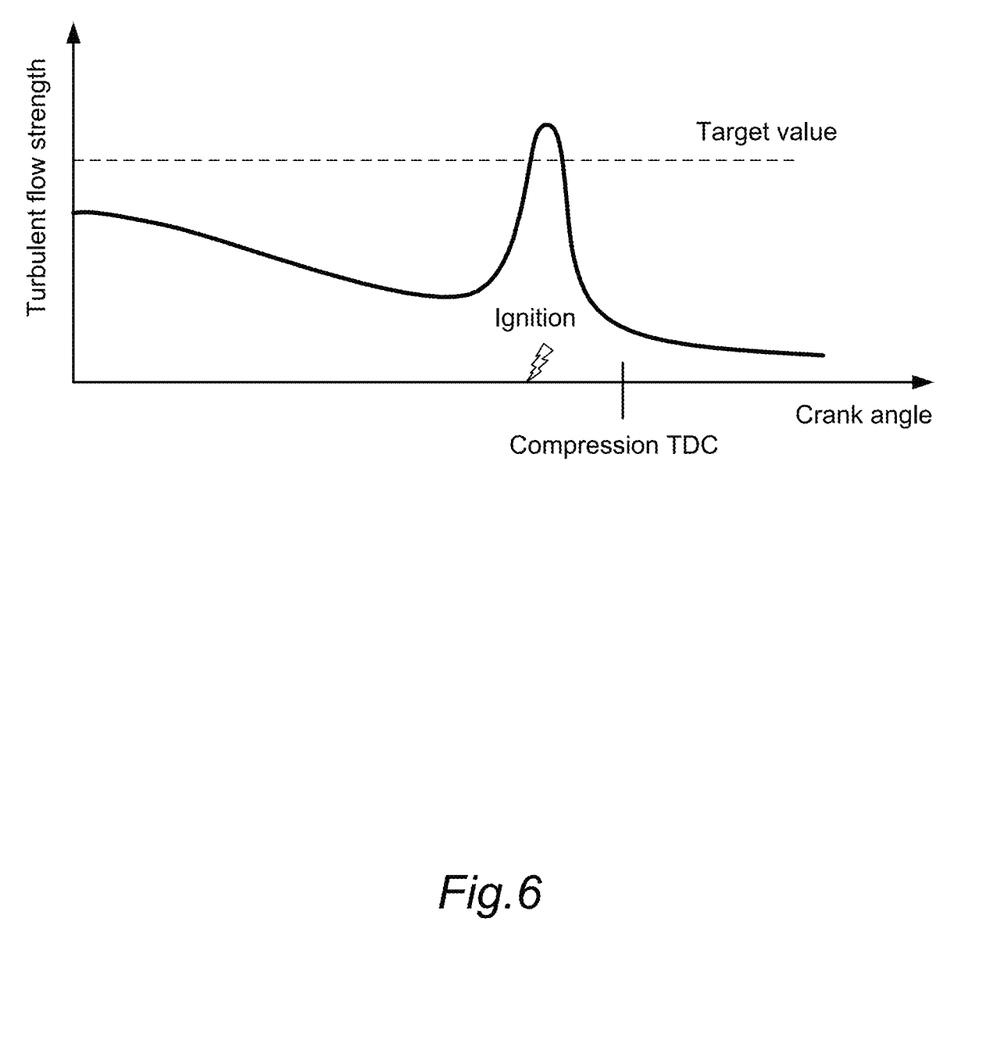
FIG. 6 is an illustrative diagram of an increase in a turbulent flow by a fuel injection valve.

FIG. 6 is an illustrative diagram of an increase in a turbulent flow in the cylinder by the fuel injection valve 12 of the present embodiment. In FIG. 6, the horizontal axis indicates the crank angle, and the vertical axis indicates turbulent flow strength.

As described above, the tumble fluidity collapses in the compression process. Therefore, the turbulent flow strength is gradually weakened in the compression process. Thus, as shown in FIG. 6, by performing the fuel injection in time with the ignition timing of the ignition plug 11, the turbulent flow strength can be enhanced. That is, by performing the fuel injection, the fluidity can be provided.

Figure 7:
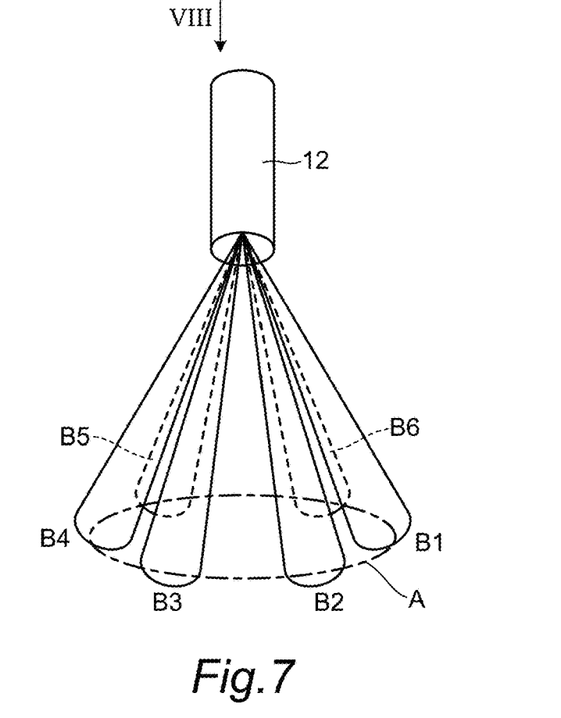
FIG. 7 is an illustrative diagram showing a mode of fuel sprays injected from the fuel injection valve.
Figure 8:
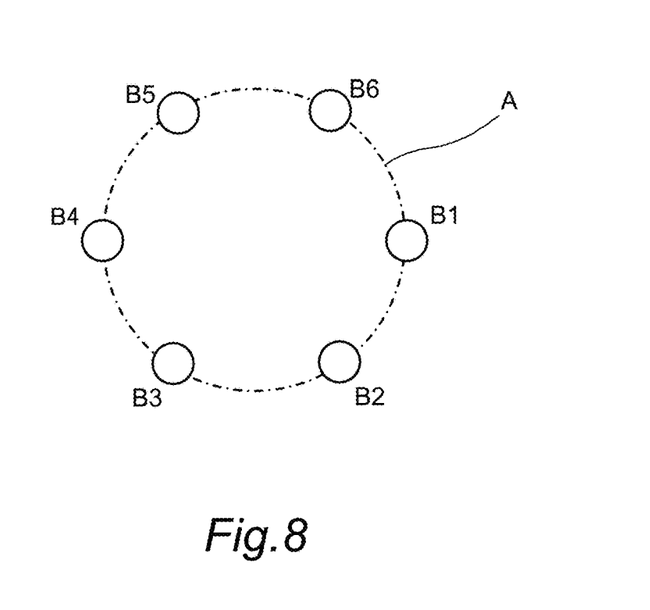
FIG. 8 is an illustrative diagram of a shape of injection beams.

FIG. 7 is an illustrative diagram showing a mode of the fuel sprays injected from the fuel injection valve 12 of the present embodiment. FIG. 8 is an illustrative diagram in which a plane including a circle A of FIG. 7 is observed from the arrow VIII direction of FIG. 7.

In the fuel injection valve 12 of the present embodiment, the fuel is injected from six injection holes. When the fuel sprays (hereinafter, also called as the spray beams) injected from the six injection holes are denoted by the reference signs B1 to B6, each of the spray beams are formed in a conical shape in which a spraying section is more widened as more distant from the injection hole.

Figure 9:
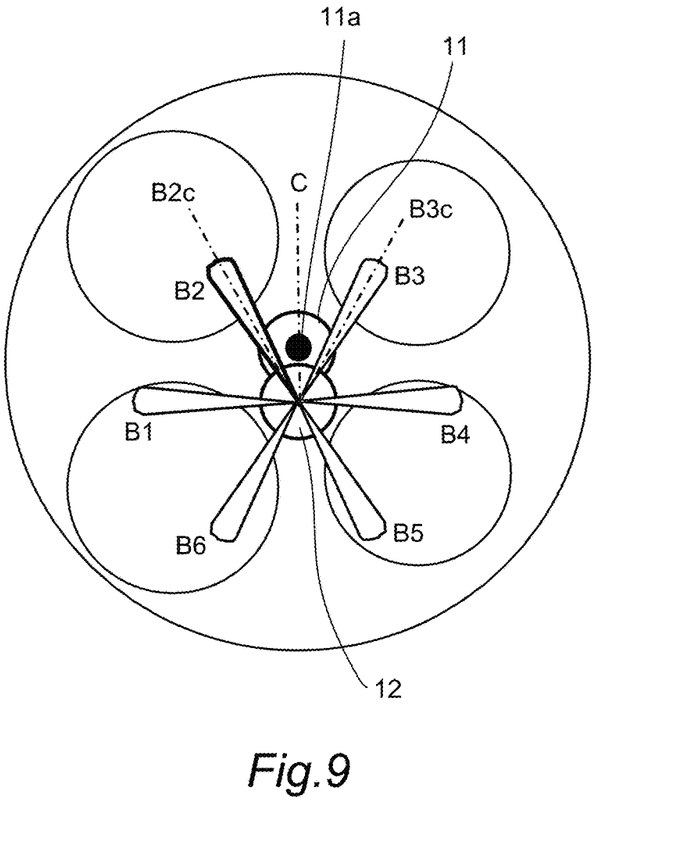
FIG. 9 is a diagram showing arrangement of the ignition plug and the fuel injection valve.

FIG. 9 is an illustrative diagram showing a positional relationship between the spray beams B1 to B6 and the ignition plug 11 of the present embodiment. The fuel injection valve 12 is arranged on a one-chain line C which is a bisector of an angle made by the center axis B2c of the spray beam B2 and the center axis B3c of the spray beam B3.

Figure 10:
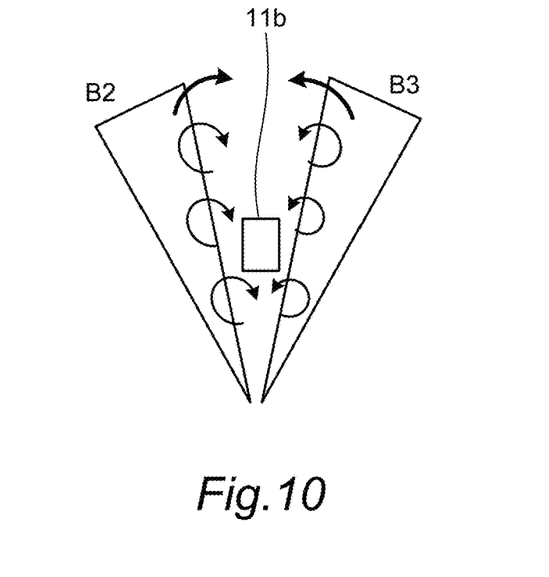
FIG. 10 is an illustrative diagram of a contraction flow of fuel injection.

FIG. 10 is an illustrative diagram for illustrating an effect by the fuel injection of the present embodiment. The fuel injected from the fuel injection valve 12 is divided into liquid droplets and becomes sprays, and advances while taking in the ambient air as in bold arrows in the figure. Thereby, turbulence of the air flow occurs around the sprays.

In a case where there is an object (including a fluid) around, a fluid is pulled to the object by the so-called Coanda effect, and flows along the object. That is, in the arrangement shown in FIG. 9, a so-called contraction flow in which the spray beam B2 and the spray beam B3 pull each other as thin arrows of FIG. 10 occurs. Thereby, a strong turbulent flow occurs between the spray beam B2 and the spray beam B3, and the plug discharge channel can be extended by the turbulent flow.

Next, a configuration of the piston 18 of the present embodiment will be described.

Figure 11:
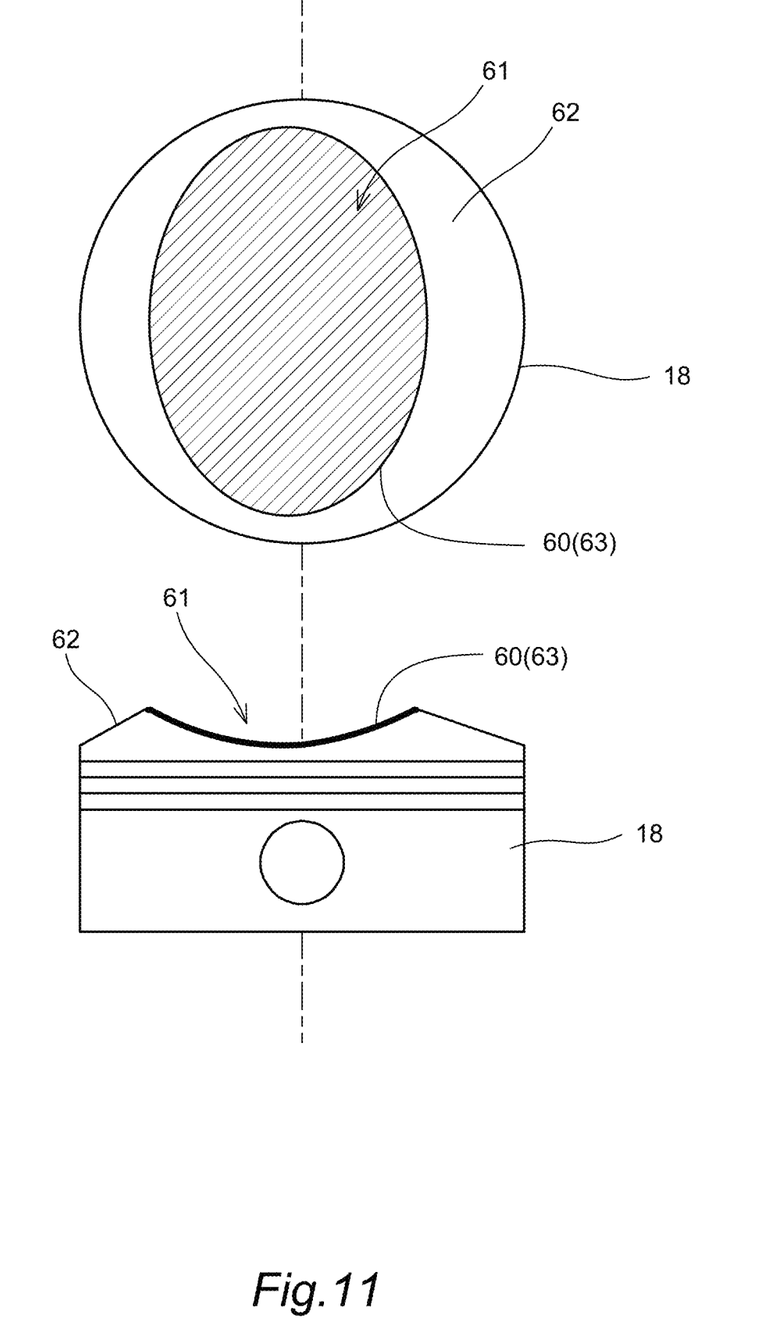
FIG. 11 is an illustrative diagram of a piston.

FIG. 11 is an illustrative diagram of the piston 18 of the present embodiment, showing a front view of the piston 18 and a side view of the piston 18.

The shallow dish 61 serving as the recessed portion suitable for holding the tumble fluidity is formed on the crown surface of the piston 18. A heat insulating film 60 is provided in this shallow dish 61 as described later.

The piston 18 is made of a metal base material such as an aluminum alloy. In a case where the heat insulating film 60 of the present embodiment is not provided on the crown surface of the piston 18, thermal conductivity of the base material of the piston 18 is large. Thus, even at combustion of the air-fuel mixture, a temperature of the crown surface of the piston 18 is not easily increased, while by a cooling loss due to this, combustion efficiency is lowered.

Therefore, conventionally, for the purpose of preventing a decrease in the temperature of the crown surface of the piston 18 and suppressing the cooling loss, a heat insulating film is formed on the crown surface of the piston 18. By forming the heat insulating film on the crown surface of the piston 18, the temperature of the crown surface of the piston 18 is not easily lowered, the cooling loss is suppressed, and a decrease in the combustion efficiency can be prevented. The conventional heat insulating film is generally formed by forming a porous alumite membrane by performing anodic oxidation treatment on a surface of the piston 18 or covering with metal, ceramic, etc. having low thermal conductivity.

The heat insulating film formed in such a way has low thermal conductivity and large thermal capacity per volume. In a case where the thermal capacity per volume is large, in an operation state where the temperature of the crown surface of the piston 18 is largely increased such as a high load operation, an increased temperature of the heat insulating film remains high, and the temperature of the crown surface of the piston 18 is not easily lowered. When the temperature of the crown surface of the piston 18 is maintained to be high, the air-fuel mixture is heated by exchanging heat between the air-fuel mixture and the heat insulating film in the intake process and the compression process.

In particular, by maintaining the tumble fluidity by the shallow dish 61 of the piston 18, a degree by which the air-fuel mixture and the heat insulating film are brought into contact with each other is increased, and a heat transfer amount from the heat insulating film to the air-fuel mixture is increased. Therefore, there is a problem that a knocking performance is lowered such as the temperature of the air-fuel mixture being more easily increased, and abnormal ignition occurring.

Thus, in the present embodiment, the heat insulating film 60 formed in the shallow dish 61 (recessed portion) on the crown surface of the piston 18 is made of a material having lower thermal conductivity and smaller thermal capacity per volume than the base material of the piston 18. The heat insulating film 60 made of such a material has small thermal capacity. Thus, even when a temperature of the heat insulating film 60 is increased at the time of combustion, the temperature of the heat insulating film 60 is then not maintained but lowered according to a decrease in the temperature in the cylinder. In such a way, a characteristic in which the temperature of the heat insulating film follows the temperature in the cylinder is called as the "swing characteristic".

The heat insulating film 60 of the present embodiment is formed by applying a porous resin material. The resin material is favorably a material having heat resistance, low thermal conductivity, and the swing characteristic. For example, porous polyimide resin is used.

In the present embodiment, as shown in FIG. 11, a heat insulating film formation portion 63 in which the heat insulating film 60 made of a porous resin material is formed is provided in a region where the shallow dish 61 is formed on the crown surface of the piston 18.

Figure 12:
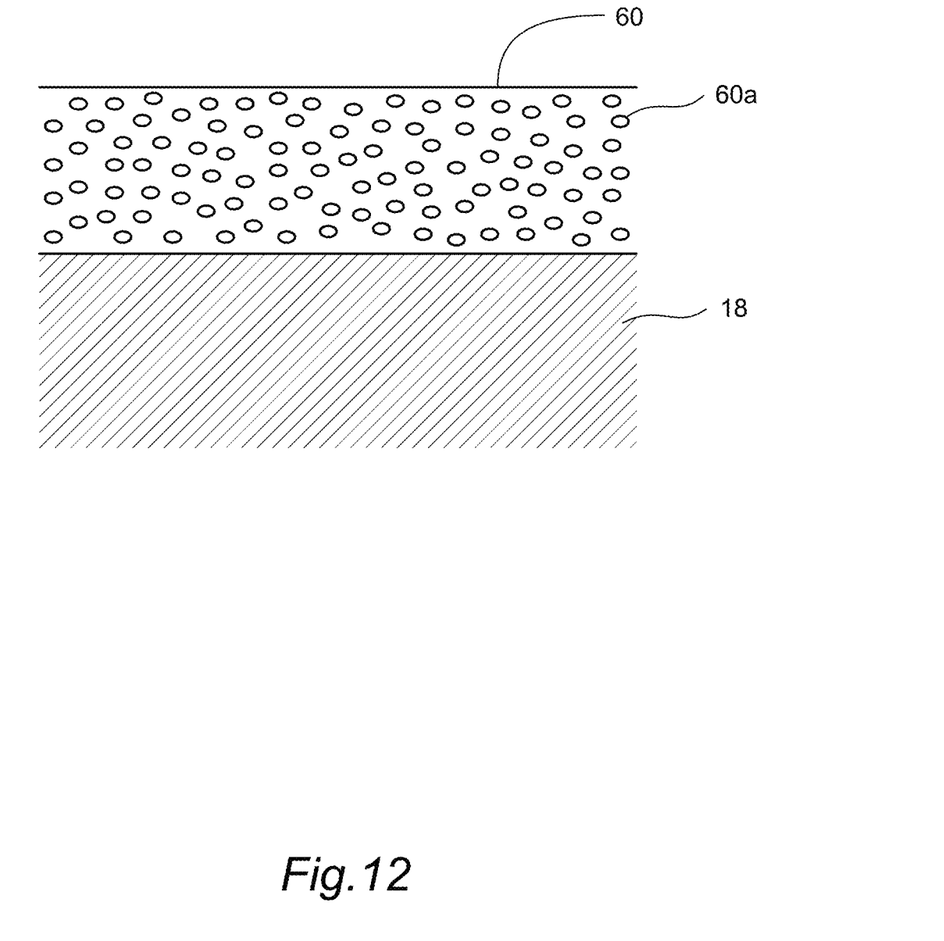
FIG. 12 is an illustrative diagram of a heat insulating film.

FIG. 12 is an illustrative diagram of the heat insulating film 60 of the present embodiment.

The heat insulating film 60 is formed by covering the shallow dish 61 on the crown surface of the piston 18 with a resin material. The resin material has a number of holes 60a as shown in FIG. 12. Since the holes 60a are distributed over the heat insulating film 60, the heat insulating film 60 having low thermal conductivity, small thermal capacity per volume, and the swing characteristic can be formed. The holes 60a may be arranged to be uniformly distributed over the heat insulating film 60 or may be arranged so that density of the holes 60a is increased or reduced in the thickness direction of the heat insulating film 60.

The heat insulating film 60 may be made of any material as long as the material is a porous material having the swing characteristic as a thermal characteristic. For example, the heat insulating film may be formed by thermally spraying a ceramic material such as zirconia onto the crown surface of the piston 18, or may be formed by thermally spraying a metal material such as nickel and molybdenum and coating the crown surface of the piston 18. A porous film may be formed by performing treatment such as anodic oxidation treatment on the crown surface of the piston 18.

On the crown surface of the piston 18, in a part other than the shallow dish 61, that is, in the vicinity of an inner diameter of the cylinder bore positioned on the more outside of an inner peripheral side region of the piston including the shallow dish 61 (outside region), a heat insulating film non-formation portion 62 not having the heat insulating film 60 is formed. In the heat insulating film non-formation portion 62, the base material of the piston 18 is exposed in the cylinder.

By forming in such a way, in the heat insulating film non-formation portion 62, after combustion, the temperature of the crown surface of the piston 18 is promptly lowered by heat transfer. Thus, the air-fuel mixture is not overheated in the vicinity of the cylinder bore where the fluidity of the air-fuel mixture is brought out of the tumble fluidity and slowed down (point shown by the reference sign A in FIG. 2). Thereby, abnormal combustion of uncombusted air-fuel mixture can be prevented. Thus, knocking can be prevented from occurring.

Figure 13:
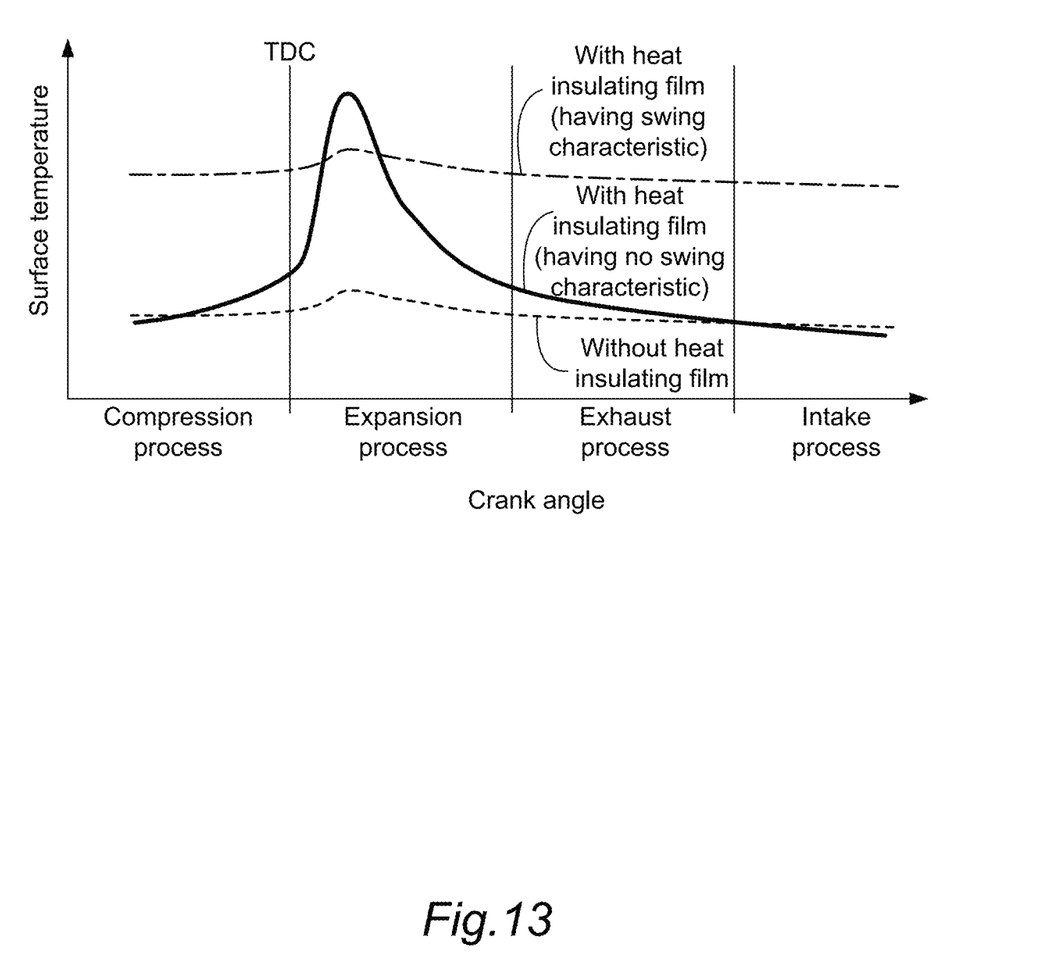
FIG. 13 is an illustrative diagram showing an example of a measurement result of a surface temperature of the piston.

FIG. 13 is an illustrative diagram showing an example of a measurement result of a surface temperature of the piston 18 having the heat insulating film 60 of the present embodiment. In FIG. 13, the horizontal axis indicates the crank angle, and the vertical axis indicates the surface temperature of the piston 18.

In FIG. 13, transition of the surface temperature of the heat insulating film of the piston 18 having the heat insulating film 60 of the present embodiment is shown by a bold solid line, a surface temperature of a piston 18 having no heat insulating film 60 is shown by a one-chain line, and a surface temperature of a heat insulating film of a piston 18 having a conventional heat insulating film which has no swing characteristic is shown by a dotted line.

Regarding the surface temperature of the piston 18 having no heat insulating film 60, thermal conductivity is large in comparison to the piston 18 having the heat insulating film 60. Therefore, as shown by the dotted line in FIG. 13, the surface temperature is slightly increased at the time of combustion of the air-fuel mixture performed immediately after the top dead center of the piston 18, and after that, the surface temperature is transitioned in a relatively low state due to heat transfer.

Meanwhile, the surface temperature of the heat insulating film of the piston 18 having the conventional heat insulating film which has no swing characteristic, that is, the heat insulating film having low thermal conductivity and small thermal capacity per volume is transitioned as shown by the one-chain line in FIG. 13. That is, since thermal conductivity is small regarding the conventional heat insulating film, the surface temperature is increased by combustion of the air-fuel mixture performed immediately after the top dead center of the piston 18, and the surface temperature remains increased even in an exhaust process and the intake process.

Comparatively, regarding the surface temperature of the heat insulating film 60 having the swing characteristic of the present embodiment, as shown by the bold solid line in FIG. 13, the surface temperature is once increased by combustion of the air-fuel mixture performed immediately after the top dead center of the piston 18. After that, since thermal capacity per volume of the heat insulating film 60 is small, heat is transferred to the piston 18, and the surface temperature is gradually lowered. After that, in the intake process, the surface temperature is lowered to the surface temperature of the piston 18 having no heat insulating film (shown by the dotted line), that is, the temperature which is equal to the base material of the piston 18.

In such a way, the surface temperature of the heat insulating film 60 having the swing characteristic of the present embodiment is temporarily increased in accordance with combustion in the compression process but lowered due to heat transfer of the piston 18 after that. Therefore, even when the air-fuel mixture moves through the surface of the shallow dish 61 by the tumble fluidity, heat transfer to the air-fuel mixture can be suppressed, and a decrease in the knocking performance can be suppressed.

Next, effects of the present embodiment will be described.

As described above, in the present embodiment, in the piston 18 of the internal combustion engine 10, the shallow dish 61 serving as the recessed portion that holds an intake air swirling flow is formed on the crown surface of the piston 18, the crown surface of the piston 18 includes the heat insulating film formation portion 63 having the heat insulating film 60 whose thermal conductivity is lower than the base material of the piston 18 and whose thermal capacity per volume is smaller than the base material of the piston 18, and the heat insulating film non-formation portion 62 formed at the position on the more outside of the cylinder bore side of the internal combustion engine 10 than the heat insulating film formation portion 63, the heat insulating film non-formation portion not having the heat insulating film 60.

In the present embodiment formed in such a way, the temperature of the crown surface of the piston 18 is increased at the time of combustion of the air-fuel mixture in the expansion process. Meanwhile, in the intake process and the compression process, the temperature of the heat insulating film 60 can be lowered. In the vicinity of the cylinder bore (the point shown by the reference sign A in FIG. 2, the heat insulating film non-formation portion 62), there is no heat insulating film 60 and the temperature of the crown surface can be lowered by heat transfer of the base material of the piston 18. Thereby, while suppressing the cooling loss at the time of combustion, the knocking performance can be improved at the time of the intake process and the compression process.

In the present embodiment, the heat insulating film formation portion 63 in which the heat insulating film 60 is formed on the crown surface of the piston 18 is formed to match with the region where the shallow dish 61 serving as the recessed portion is formed. By forming in such a way, in the intake process and the compression process, heat exchange in the shallow dish 61 where the fluidity of the air-fuel mixture by the intake air swirling flow is increased can be suppressed. Thus, while suppressing the cooling loss at the time of combustion, the knocking performance can be improved at the time of the intake process and the compression process.

In the present embodiment, the shallow dish 61 of the piston 18 is formed to hold the tumble fluidity as the intake air swirling flow of the intake air flowing into the cylinder of the internal combustion engine 10. By forming in such a way, heat exchange with the air-fuel mixture moving in the shallow dish 61 by the tumble fluidity can be suppressed by the heat insulating film 60. Thus, while suppressing the cooling loss at the time of combustion, the knocking performance can be improved at the time of the intake process and the compression process.

In the present embodiment, the heat insulating film 60 is made of a porous resin material such as porous polyimide applied on to the crown surface of the piston 18. By forming in such a way, the heat insulating film can be formed by a simple process of applying a resin material. Thus, in comparison to an anodic oxidation film, thermal spraying of ceramics, etc., cost of a manufacturing process of the piston 18 can be reduced.

The embodiment of the present invention is described above. However, the above embodiment does not intend to limit the technical scope of the present invention to the specific configurations of the above embodiment but only indicates part of application examples of the present invention. For example, although the shallow dish 61 of the piston 18 is formed into a shape to hold the tumble fluidity as the intake air swirling flow, the present invention is not limited to this. The shallow dish 61 may have a shape to hold swirl fluidity. The shallow dish 61 is not necessarily formed in a recessed shape but may be formed in any shape as long as the intake air swirling flow (the tumble fluidity or the swirl fluidity) is held by the shape. A valve recess may be formed on the crown surface of the piston 18.

In the present embodiment, the heat insulating film formation portion 63 in which the heat insulating film 60 is formed does not necessarily match with the region of the shallow dish 61. The heat insulating film 60 may be formed on the more outside of an outer periphery of the shallow dish 61, or the heat insulating film 60 may be formed on the more inside of the outer periphery of the shallow dish 61.

Embodiments of the present invention were described above, the above embodiments are merely examples of applications of this invention, and the technical scope of this invention is not limited to the specific constitutions of the above embodiments.

The invention claimed is:

1. A piston of an internal combustion engine, in which a shallow dish serving as a recessed portion that holds an intake air swirling flow is formed on a crown surface of the piston, wherein the shallow dish is formed in a smooth recessed shape suitable for holding the intake air swirling flow, the crown surface includes:

a heat insulating film formation portion having a heat insulating film whose thermal conductivity is lower than a base material of the piston and whose thermal capacity per volume is smaller than the base material of the piston, the heat insulating film is provided in the shallow dish and the heat insulating film formation portion has an area equal to an area of the shallow dish; and a heat insulating film non-formation portion provided at a position on the more outside of a cylinder bore side of the internal combustion engine than the heat insulating film formation portion provided in the shallow dish and formed in the vicinity of the cylinder bore where a flow of air-fuel mixture is brought out of tumble motion and slowed down, the heat insulating film non-formation portion adjoining the shallow dish and not having the heat insulating film, and a temperature of the heat insulating film is increased in an expansion process, and then lowered to a temperature equal to a temperature of the base material of the piston in an intake process.

2. The piston according to claim 1, wherein the heat insulating film is made of a porous resin material applied on to the crown surface.

* * * * *